US006076800A

United States Patent [19]

Heinz et al.

[11] Patent Number: 6,076,800

[45] Date of Patent: Jun. 20, 2000

[54] VALVE FOR CONTROLLING FLUIDS

[75] Inventors: Rudolf Heinz, Renningen; Dieter Kienzler, Leonberg; Roger Potschin, Brackenheim; Klaus-Dieter Schmoll, Lehrensteinsfeld; Friedrich Boecking, Stuttgart, all of Germany

[73] Assignee: Robert Bosch GmbH, Stuttgart, Germany

[21] Appl. No.: 09/180,023

[22] PCT Filed: Nov. 19, 1997

[86] PCT No.: PCT/DE97/02709

§ 371 Date: Oct. 30, 1998

§ 102(e) Date: Oct. 30, 1998

[87] PCT Pub. No.: WO98/40623

PCT Pub. Date: Sep. 17, 1998

[30] Foreign Application Priority Data

Mar. 10, 1997 [DE] Germany ........................... 197 09 794

[51] Int. Cl.[7] .......................... F16K 31/122; F16K 31/02

[52] U.S. Cl. .................... 251/129.06; 251/57; 239/585.1

[58] Field of Search ................................ 251/129.06, 57, 251/30.02; 239/585.1, 88, 89, 533.3

[56] References Cited

U.S. PATENT DOCUMENTS

| | | | |
|---|---|---|---|
| 4,762,300 | 8/1988 | Inagaki et al. | 251/129.06 |
| 4,813,601 | 3/1989 | Schwerdt et al. | 239/91 |
| 4,995,587 | 2/1991 | Alexius | 251/129.06 |
| 5,209,453 | 5/1993 | Aota et al. | 251/57 |
| 5,803,361 | 9/1998 | Horiuchi et al. | 239/88 |

*Primary Examiner*—John Rivell
*Assistant Examiner*—Meredith Schoenfeld
*Attorney, Agent, or Firm*—Ronald E. Greigg; Edwin E. Greigg

[57] ABSTRACT

A valve for controlling fluids, in which the valve member is adjusted by means of an actuating piston, which, together with a piezoelectric actuator piston, encloses a pressure chamber. In addition, the actuator piston and an affiliated piezoelectric stack are disposed in parallel radially next to the actuating piston, wherein upon excitation of the piezoelectric stack or adjustment of the actuator piston, the actuating piston executes a motion counter to the adjusting movement, and with its valve member, opens a relief bore.

6 Claims, 2 Drawing Sheets

VALVE FOR CONTROLLING FLUIDS

PRIOR ART

The invention relates to a valve for controlling fluids in a fuel injection valve. A valve of this kind has been disclosed by U.S. Pat. No. 4,813,601. The actuating piston of the valve member there is disposed so that it can move in a sealed fashion in a smaller diameter part of a stepped bore, while a larger diameter piston, which is moved with the piezoelectric actuator, is disposed in a larger diameter part of the stepped bore. A hydraulic chamber is fixed between the two pistons in such a way that when the larger piston is moved by the actuator by a particular distance, the actuating piston of the valve member is moved by a distance that is extended by the translation ratio of the stepped bore diameters. The valve member, the actuating piston, the larger diameter piston, and the piezoelectric actuator are disposed one after the other on a common axis. This disposition has the disadvantage that it requires a large amount of space, especially with regard to the length, when one takes into consideration the fact that for an effective actuation, a piezoelectric actuator is embodied as quite large.

ADVANTAGES OF THE INVENTION

The control valve according to the invention, has the advantage over the prior art that the position of the piezoelectric actuator in front of the actual valve member with its actuating piston can be disposed separately. i.e. at a spatial distance lateral to the valve member. As a result, with the necessarily large structural form of a piezoelectric actuator, space for accommodating this actuator is created next to the centrally disposed valve member. The actuator and valve member can thereby be disposed in parallel fashion next to each other over large areas.

Two exemplary embodiments of the invention are represented in the drawings and will be explained in detail in the subsequent description.

DETAILED DESCRIPTION OF THE DRAWINGS

Figure 1:
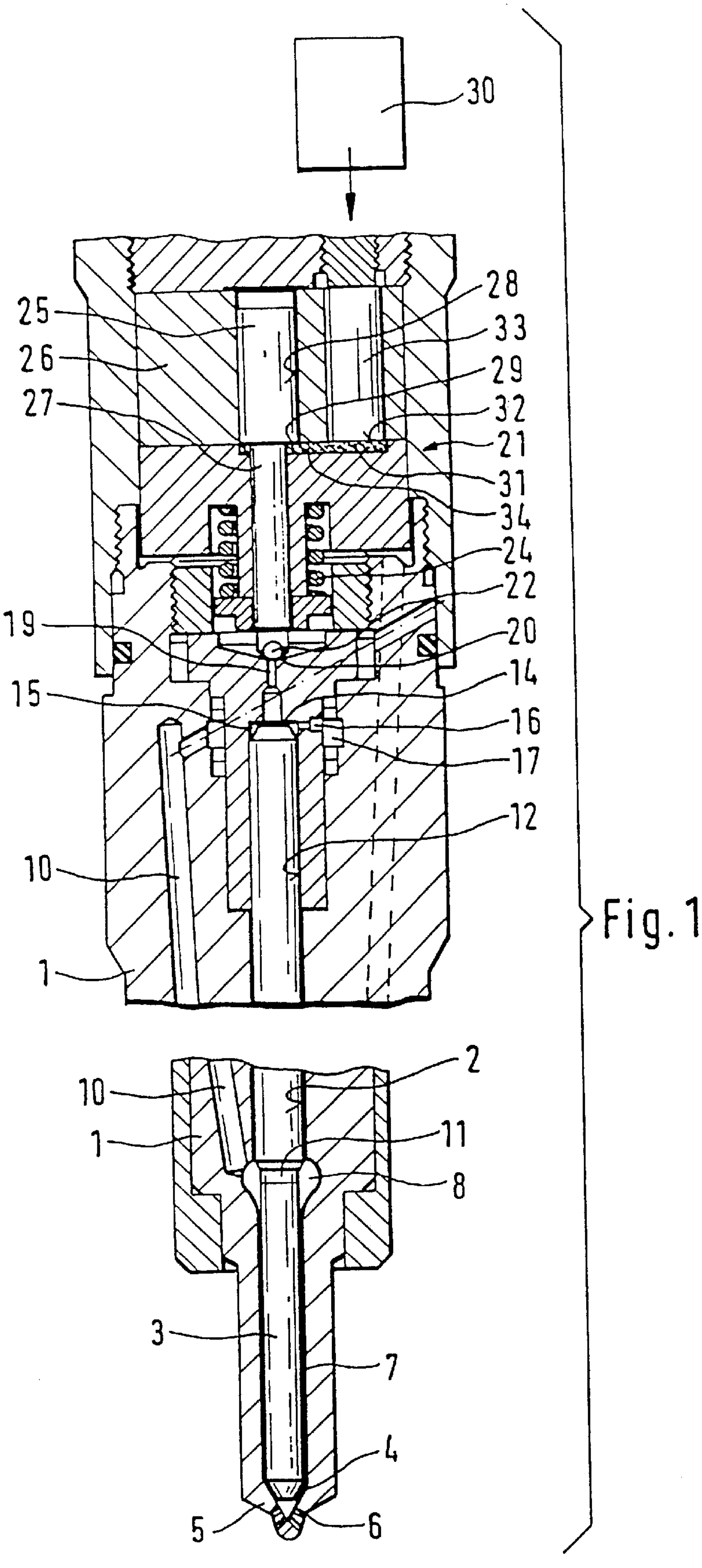
FIG. 1 shows a first exemplary embodiment installed in an electrically controlled fuel injection valve that is embodied as a 2/2-way valve, of which only the essential parts are depicted.

The valve according to the invention is used in a fuel injection valve, essential parts of which are shown in the sectional view in FIG. 1. This injection valve has a valve housing 1 in which a valve needle 3 is guided in a longitudinal bore 2. On its one end, the valve needle is provided with a conical sealing face 4, which on the tip 5 of the valve housing that protrudes into the combustion chamber, cooperates with a seat from which injection openings lead. The injection openings connect the interior of the injection valve, in this instance the annular chamber 7 encompassing the valve needle and filled with fuel under injection pressure, to the combustion chamber in order to thus execute an injection when the valve needle has lifted up from its seat. The annular chamber communicates with another pressure chamber 8, which continuously communicates with a pressure line 10, by way of which the fuel injection valve is supplied with fuel at injection pressure from a high-pressure fuel reservoir not shown in detail here. This high fuel pressure also prevails in the pressure chamber 8 and acts on a pressure shoulder 11 on the valve needle 3 by way of which the nozzle needle can be lifted up from its valve seat in a known manner under suitable conditions.

On the other end of the valve needle, the valve needle is guided in a cylinder bore 12 and with its end face 14, encloses a control pressure chamber 15, which continuously communicates by way of a throttle connection 16 with an annular chamber 17, which, like the annular chamber 8, also continuously communicates with the high-pressure fuel reservoir. In the embodiment according to the invention, a throttle bore 19 leads axially from the control pressure chamber 15 to a valve seat 20 of a control valve 21. The valve seat 20 cooperates with a valve member 22 of the control valve 21, which in the lifted state, produces a communication between the control pressure chamber 15 and a relief chamber.

The valve member 22 is acted on by a compression spring 24 in the closing direction, i.e. toward the valve seat 20 so that in the normal position of the control valve, this connection of the control pressure chamber 15 is closed. Since the end face surface area of the valve needle in the region of the control pressure chamber is greater than the surface area of the pressure shoulder 11, the same fuel pressure in the control pressure chamber, which also prevails in the annular chamber 8, now holds the valve needle 3 in the closed position. However, if the valve member 22 is lifted, then the pressure in the control pressure chamber 15 is relieved due to the throttling action of the throttle connection 16. With the closing force now being insufficient, the valve needle opens rapidly and can on the other hand, be brought into the closed position as soon as the valve member 22 comes back into the closed position. From this time forward, the original high fuel pressure builds back up again rapidly in the control pressure chamber 15 by way of the throttle 16.

The control valve according to the invention has an actuating piston 25, which is connected to the valve member 22 and has a greater diameter in comparison to the shaft 27 that is guided in the housing 26. The piston 25 is guided in a sealed fashion in a guide bore 28 and with its annular shoulder 29 at the transition to the shaft 27, defines a pressure chamber 31 of the control valve, which extends crosswise and laterally in relation to the axis of the actuating piston 25. This chamber is furthermore defined by an end face 32 of an actuator piston 33 in such a way that the pressure chamber 31 is enclosed on all sides. The axis of the actuating piston is disposed coaxial to the axis of the valve needle 3 and the axis of the actuator piston 33 is disposed parallel to this axis. The actuator piston 33 is likewise guided in a sealed fashion in the housing 26 and is moved by a piezoelectric stack 30 that is only indicated here. Upon excitation of the piezoelectric stack, an expansion occurs in such a way that the actuator piston attempts to reduce the volume of the pressure chamber 31, which is immediately compensated for by virtue of the fact that the actuating piston 25 is lifted up. Since in diameter, the actuator piston has a greater surface area in relation to the pressure chamber 31 than the annular shoulder 29 of the actuating piston, it executes a movement that is translated by surface area ratios and even with small piezoelectric length changes, it is adjusted by a significantly greater distance counter to the restoring force of the compression spring 24, wherein the control valve unblocks the throttle bore 19 in order to relieve the control pressure chamber 15.

As already explained at the beginning, this embodiment offers the advantage that the actuator with the piezoelectric stack and the actuator piston can be disposed next to the actuating piston 25, with an axis disposed parallel to the axis of the fuel injection valve and that the structural length is reduced by means of the overlapping of the parts in relation to each other. Furthermore, the manufacturing is simplified because in connection with the actuator, there are no coaxial bores with different diameters that would require a double pass.

In addition, the pressure chamber 31 can be embodied so that in the region between the end faces of the actuator piston and the actuating piston, a throttle passage 34 can be realized, with which it can be achieved that an oscillation due to the very rapid actuator motion can be reduces at this throttle passage. Consequently, the valve member 22 of the control valve can be reliably and rapidly brought into an open position or a closed position.

Figure 2:
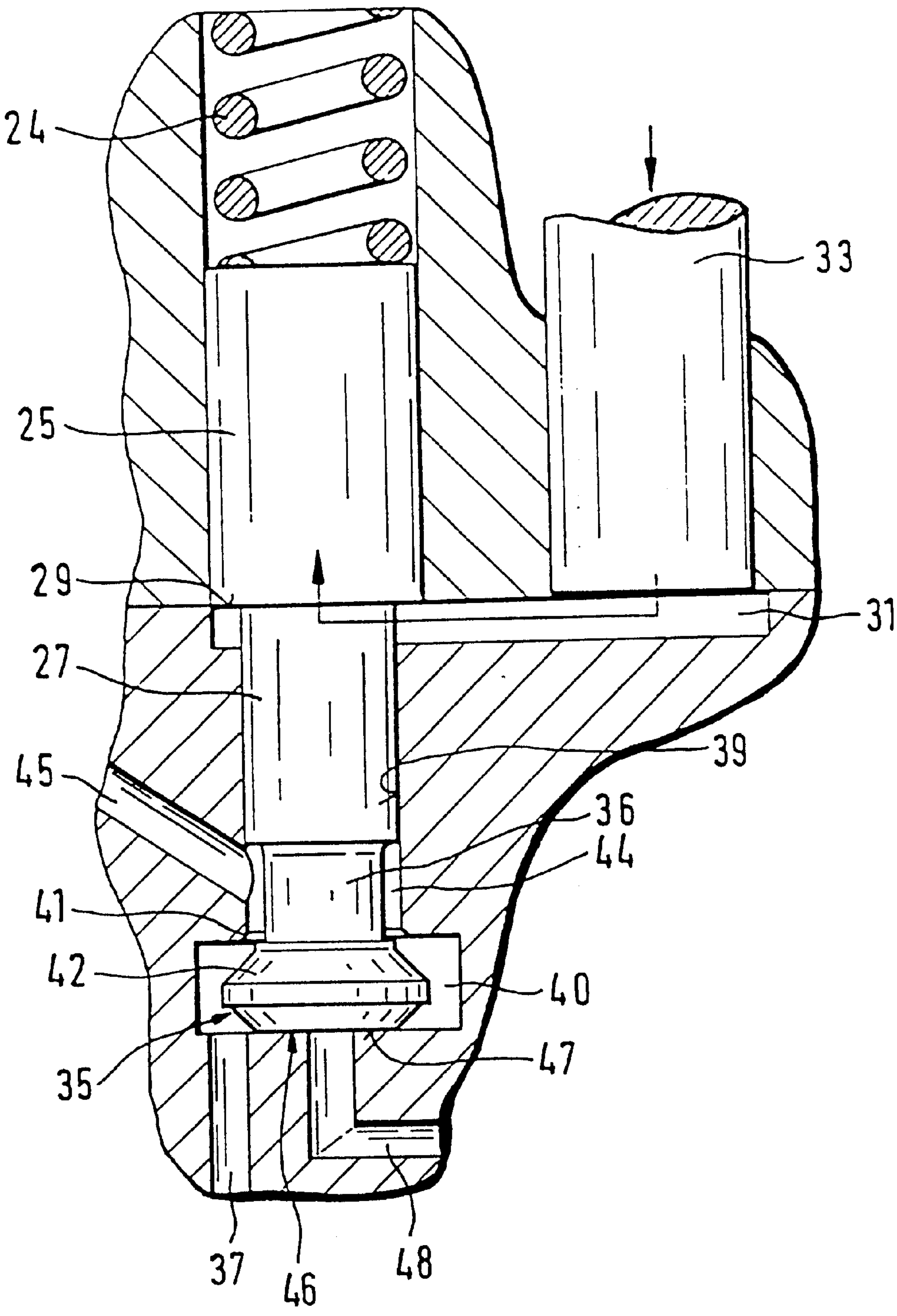
FIG. 2 shows a second exemplary embodiment of the control valve as a 3/2-way valve.

The exemplary embodiment according to FIG. 2 differs from the one in FIG. 1 by virtue of the fact that here, a 3/2-way valve is produced instead of a 2/2-way valve. In addition, the valve member has a valve head 35, which in turn is connected to the actuating piston 25 by way of the shaft 27. The shaft 25 is guided in a guide bore 39, which feeds into a widened chamber 40 in which the valve head 35 can be moved back and forth. This chamber continuously communicates by way of a conduit 37 with the control pressure chamber 15, which is not shown in detail here and corresponds to the one from FIG. 1. In the transition between the chamber 40 and the guide bore 39, a first valve seat 41 is embodied, which cooperates with a conical sealing face 42 of the valve head, which face is oriented toward the actuating piston 25. Adjoining this valve head, the shaft has an annular groove 36, which together with the guide bore, constitutes an annular chamber 44, which continuously communicates with the high-pressure fuel reservoir by way of a high-pressure line 45 that feeds into the guide bore 39. In the position shown, fuel can thereby travel by way of the annular chamber 44 into the chamber 40 and from there, by way of the conduit 37 into the control pressure chamber 15, where this pressure holds the valve needle 3 in the closed position. The supply by way of a throttle 16 into the control pressure chamber 15 that is provided in FIG. 1 is omitted in this instance.

The valve head furthermore has a flat sealing face 46 on its end face, with which it rests in a sealed fashion against a flat seat 47 in the position shown, through the action of the compression spring 24'. In this position, the valve head closes a relief line 48, by way of which the chamber 40 and also the control pressure chamber 15 can be relieved when the valve head 35 is disposed in contact with the first valve seat 41 and consequently shuts off the high-pressure supply into the chamber 40. The valve head reaches this position, in turn, when the actuator piston 33 has displaced pressure fluid, e.g. also fuel in this instance, by way of the pressure chamber 31, and thereby has lifted the actuating piston 25 by way of its shoulder 29. In this manner, with this 3/2-way valve in an exact association, the control pressure chamber is relieved in the one valve position and is acted on with high pressure in the other valve position. The embodiment has the advantage that with a piezoelectric stack that is without current, the spring 24' assures that the control valve is brought into the rest position shown, in which the relief line 48 is closed and the control pressure chamber 15 is at a high fuel pressure. Consequently, the injection valve is also closed when the piezoelectric stack is not excited. This is a significant safety aspect since in the event of a failure of the energy supply part of the vehicle, an excessive fuel injection quantity is prevented. Furthermore, the energy requirement for controlling the control valve is lower when it only has to be supplied with current for the purpose of relief at the time of the short injection event and can in turn be without current during the long injection pauses. The embodiment of the valve head shown in FIG. 2 also has a significant advantage which is comprised in that the one valve seat is a conical seat and the other valve seat is a flat seat. Due to the flat seat provided here, no special measures have to be taken for the association of the two seats to each other, which would be different if two conical seat valves had to be controlled with the valve head. The corresponding embodiment of the valve head in this exemplary embodiment can achieve the fact that the balance of forces at the valve head 35 acts on the valve member in the closed position by utilizing the high fuel pressure acting on it.

The foregoing relates to a preferred exemplary embodiment of the invention, it being understood that other variants and embodiments thereof are possible within the spirit and scope of the invention, the latter being defined by the appended claims.

What is claimed is:

1. A valve for controlling fluids, comprising a valve member (22) that has an actuating piston (25), which is acted on by a spring (24) in a closing direction of the valve member (22) to contact a valve seat (20) and defines a pressure chamber (29), said pressure chamber (29) is additionally defined by a piezoelectric actuator (30), a movement of said piezoelectric actuator (30) generates a pressure increase in the pressure chamber (29), by means of which the actuating piston (25) is adjusted in an opening direction counter to a force of the spring (24), the actuator (30) is disposed parallel to the actuating piston (25) and radially next to it, and the pressure chamber (29) is divided into a first partial chamber and a second partial chamber, and these partial chambers communicate with each other by way of a conduit (34) that extends crosswise to the axis of the actuating piston, and a throttle location is disposed in said conduit (34).

2. The valve according to claim 1, in which the valve member has two sealing faces (42, 46), one of which is brought into contact with the valve seat (20) through the force of the spring (24) in a first position of the valve member (22) and the other of which is brought into contact with a second valve seat (47) when the piezoelectric actuator is excited in a second position of the valve member (22).

3. The valve according to claim 2, in which the valve member has a valve head (35), with a first conical sealing face (42) which, together with a first valve seat (20), controls a high-pressure supply (45) to a control pressure chamber (15) and with a second flat seat sealing face (46), which cooperates with a flat seat (47) and together with the flat seat, controls a relief line (48) of the control pressure chamber (15).

4. The valve according to claim 1, in which the valve is used for controlling the pressure of a control pressure chamber (15) belonging to an injection valve that has a valve closing member (3), said valve is held in the closed position by the pressure in the control pressure chamber (15) counter to a fuel pressure that is supplied from a high-pressure fuel reservoir and acts on pressure surfaces (11) of the valve member (3), and when the control pressure chamber (15) is relieved, the valve member is forced into the open position through the action of this fuel pressure.

5. The valve according to claim 2, in which the valve is used for controlling the pressure of a control pressure chamber (15) belonging to an injection valve that has a valve closing member (3), said valve is held in the closed position by the pressure in the control pressure chamber (15) counter to a fuel pressure that is supplied from a high-pressure fuel reservoir and acts on pressure surfaces (11) of the valve member (3), and when the control pressure chamber (15) is relieved, the valve member is forced into the open position through the action of this fuel pressure.

6. The valve according to claim 3, in which the valve is used for controlling the pressure of a control pressure chamber (15) belonging to an injection valve that has a valve closing member (3), said valve is held in the closed position by the pressure in the control pressure chamber (15) counter lo a fuel pressure that is supplied from a high-pressure fuel reservoir and acts on pressure surfaces (11) of the valve member (3), and when the control pressure chamber (15) is relieved, the valve member is forced into the open position through the action of this fuel pressure.

* * * * *